United States Patent [19]
Chang

[11] Patent Number: 5,208,616
[45] Date of Patent: May 4, 1993

[54] FOLDING SPECTACLES

[76] Inventor: Antony Chang, 5F, No. 43, Lane 2, Sec. 6, Chung Shan N. Rd., Taipei, Taiwan

[21] Appl. No.: 777,002

[22] Filed: Oct. 16, 1991

[51] Int. Cl.$^5$ .............................................. G02C 5/08
[52] U.S. Cl. .................................... 351/63; 351/158
[58] Field of Search .......... 351/63, 119, 158; 2/442, 443

[56] References Cited

U.S. PATENT DOCUMENTS 4,711,539 12/1987 Krusas et al. .......................... 351/63
5,028,126 7/1991 Takeuchi ............................... 351/63

Primary Examiner—Rodney B. Bovernick
Attorney, Agent, or Firm—Bacon & Thomas

[57] ABSTRACT

Super-slim folding spectacles comprising two symmetrically arranged spectacle frames and perpendicularly assembled temples, in which the two frames are assembled with a hinged joint in two parts, one of which has a spring pin protruding out of a blind hole in a groove and rolling over an arched end of the other part until it sticks in a notch of a groove to thus fix the two frames in an unfolded position is disclosed. The frames can be easily, horizontally folded until they are parallel in a common plane and close together with their temples separately folded and lying across them. The folded spectacles, which are small and thin in size and conveniently arranged for carrying and storing, are practical and considered a brand-new design.

4 Claims, 5 Drawing Sheets

FOLDING SPECTACLES

BACKGROUND OF THE INVENTION

The present invention pertains to a pair of super-slim folding spectacles which can be folded to a minimum size.

A conventional pair of folding spectacles able to be folded only in two (see FIG. 1) and having its spectacles frames simply assembled has the following disadvantages: (1) The overlapped foldings increase thickness and inconvenience in packing and storing. (2) The spectacles frames which should be tightly fixed with screws cannot be actively folded and the screws are apt to be loose after the spectacles are folded many times.

To eliminate all the mentioned shortcomings, a pair of super-slim folding spectacles is provided whose renovated structure has the following features: (1) The two framed lenses are horizontally folded until they are positioned in a parallel, close together relationship so that the whole pair of spectacles is small and thin in size and can be conveniently carried and stored. (2) The hinged joint of the two frames is composed of two parts, one of which has a spring pin protruding out of a blind hole of a groove and extending toward an arched end of the other part where the pin sticks in a notch of a groove and thus the two frames are positioned in a predetermined matter when they are folded or unfolded. This new design as mentioned above eliminates disadvantages of the conventional structure of folding spectacles and also ensures practicality of the folding spectacles. The following drawings are helpful for further understanding of the structure and the functions of the new design.

SUMMARY OF THE INVENTION

This invention pertains to the structure of super-slim folding spectacles comprising two symmetrically arranged spectacles frames and perpendicularly assembled temples, in which the two frames are assembled with a hinged joint in two parts. One of the frames has a spring pin extruding out of a blind hole in the groove at the hinged joint which extends over an arched end of the other part until it sticks in a notch of a groove and thus the two frames are fixed. By this arrangement, the frames can be easily horizontally folded until they are positioned parallel and close together with their temples separately folded and lying across them. The folded spectacles are small and thin in size, convenient for carrying and storing purposes, and are practical.

DETAILED DESCRIPTION OF THE DRAWINGS

Figure 1:
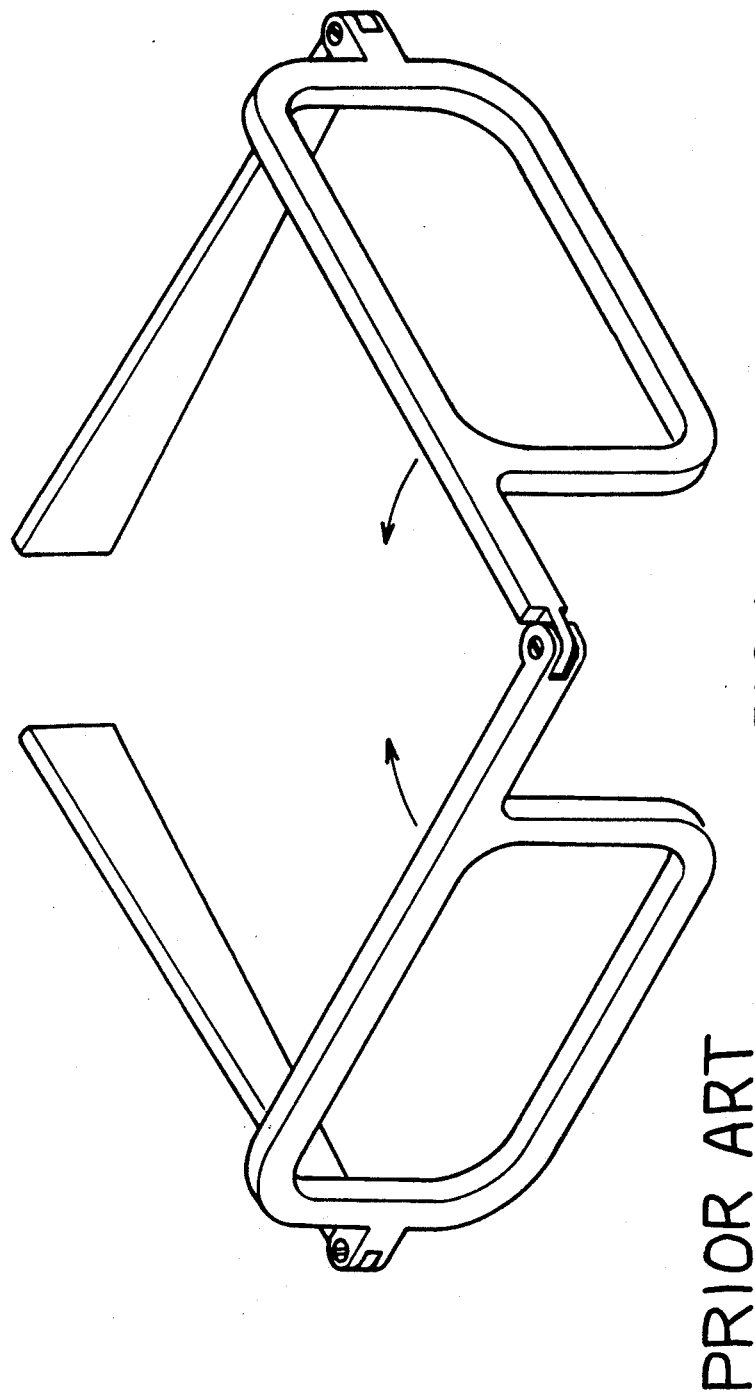
FIG. 1 illustrates a perspective view of a pair of folding spectacles according to the prior art.
Figure 2:
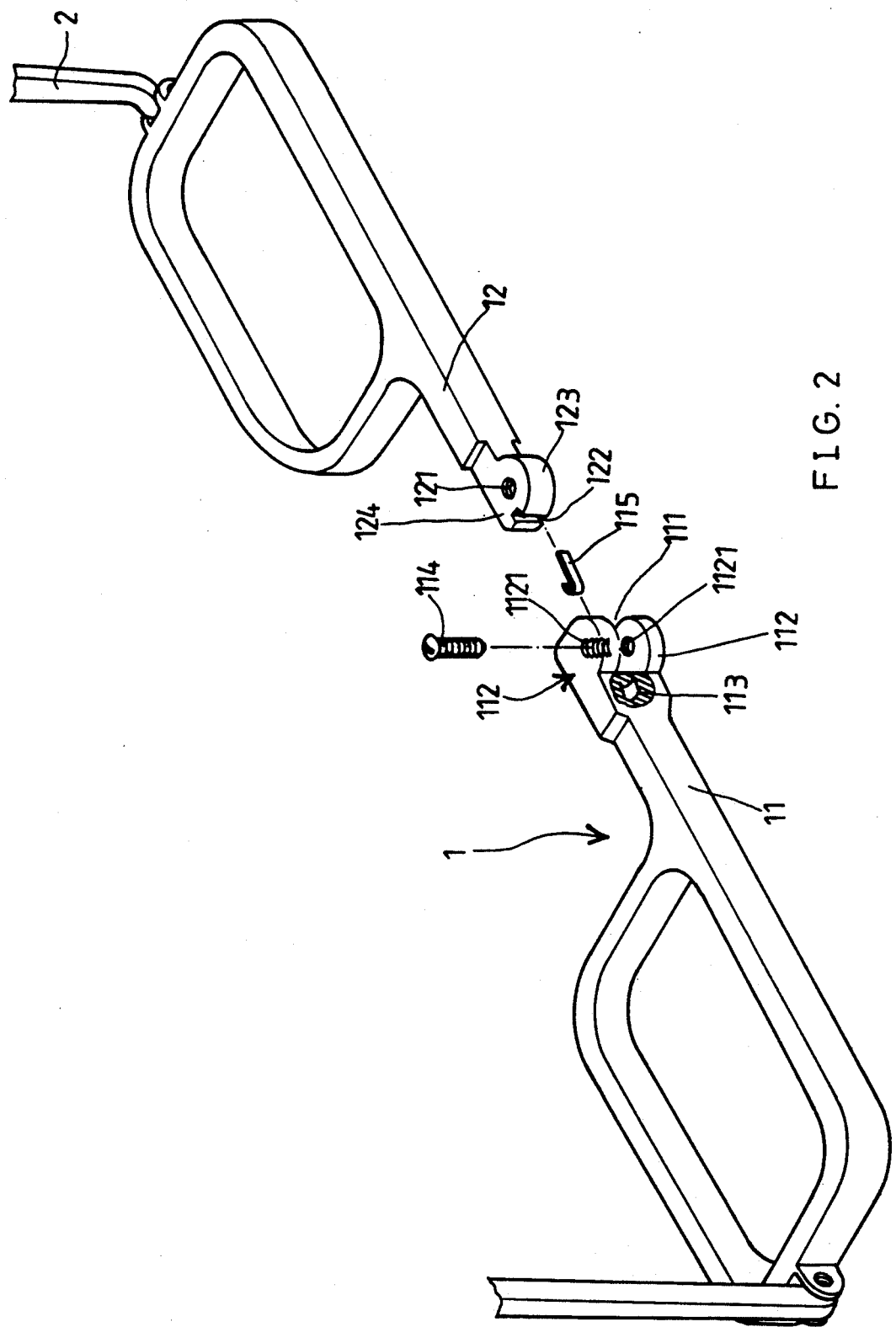
FIG. 2 illustrates a pictorial drawing showing the details of the construction of the folding joint between the two spectacles frames according to the present invention.
Figure 3:
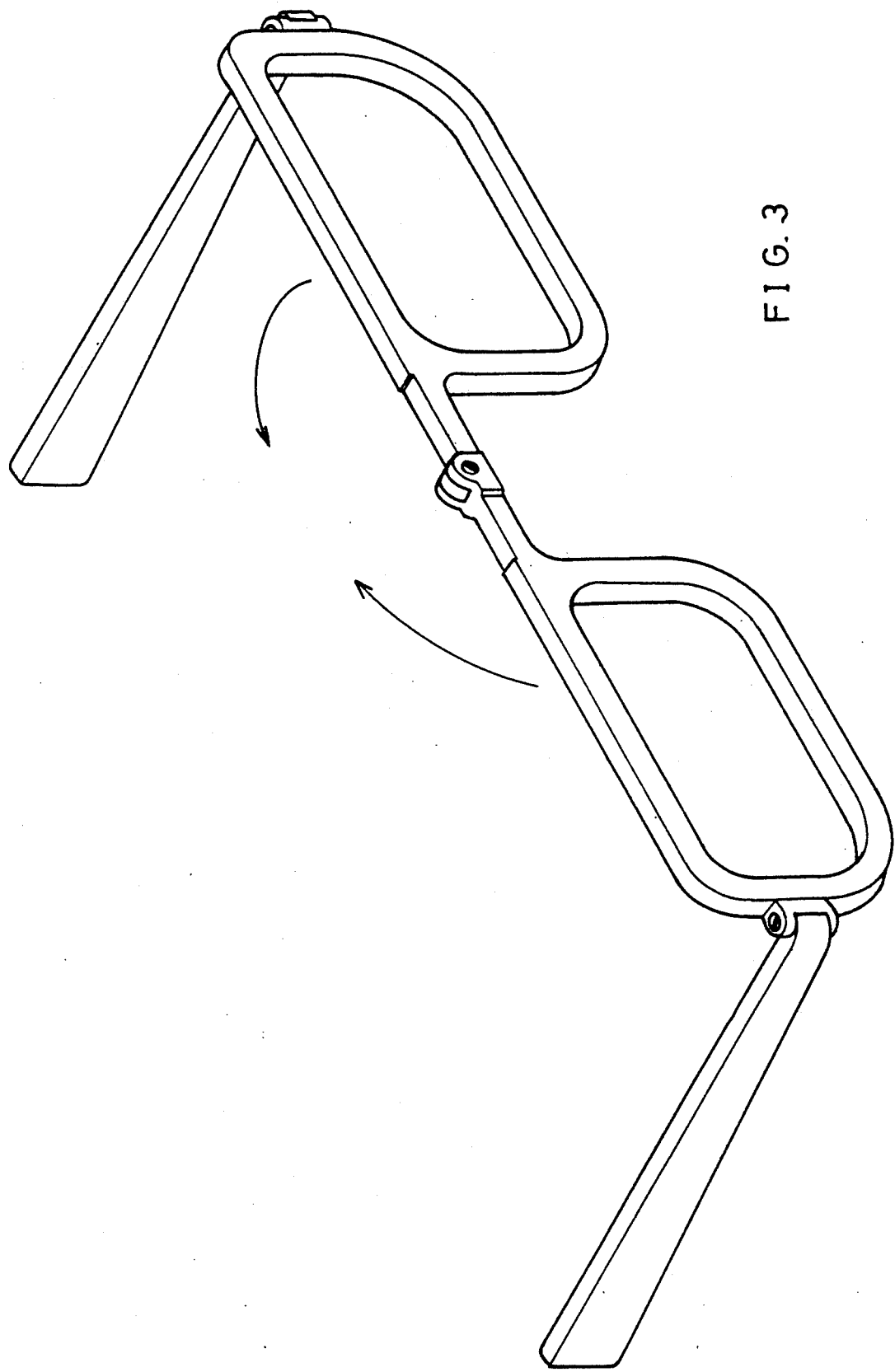
FIG. 3 illustrates a full perspective view of the spectacles according to the present invention in an unfolded condition.
Figure 4:
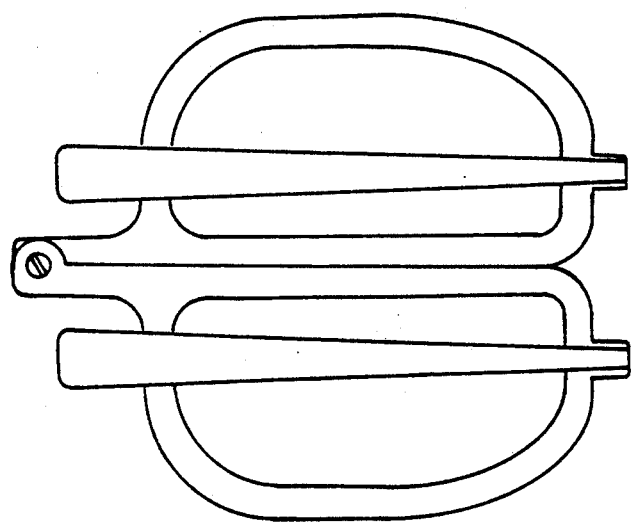
FIG. 4 illustrates a full view of the spectacles of FIG. 3 in a fully folded condition.

With initial reference to FIGS. 2-4, this invention mainly comprises spectacles frames 1 and temples 2, in which the spectacles frames 1 include a right frame 11 and a left frame 12. The right frame 11 has an extension whose end is divided by a groove 111, and thus a two-forked end 112 is formed. Extending through the middle of the two-forked end 112 is a screw hole 1121. Furthermore, in the end of the groove 111, a blind hole 113 is formed. The left frame 12 includes an arched end 123 in the same shape as the forked end 112. In the middle of the arched end 123, a vertically extending through screw hole 121 (as viewed in FIG. 2) is provided, and a flank 124 of the arched end 124 is formed with a groove 122.

The two temples (2) are hingedly assembled with two outer edges of the frames (1) in a manner known in the art.

The entire body of this invention is assembled in the following sequence: first, a spring pin 115 is placed into the blind hole 113 of the right spectacle frame 11; second, the arched end 124 of the left frame 12 is inserted in the groove 111 of the right frame 11; finally, a screw 114 is threaded into the screw holes 1121, 121. After the spectacles frames 11, 12 are assembled, the spring pin 115 will slide over the arched end 123 as the frames 11, 12 are unfolded until the pin 115 sticks in the groove 122 which positions the frames 11, 12 in their fully unfolded position. The two spectacles frames 11, 12 are horizontally folded in the same plane defined by frames 11, 12 about screw 114, which extends perpendicular to the plane defined by frames 11, 12, so that the two frames remain parallel and close together with their temples being separately folded across them as shown in FIG. 4. In this way, a pair of folded spectacles only having a thickness equivalent to that of a lens and that of a temple which is about half the thickness of a conventional pair of folding spectacles, so that the folding spectacles can be conveniently carried.

Figure 5:
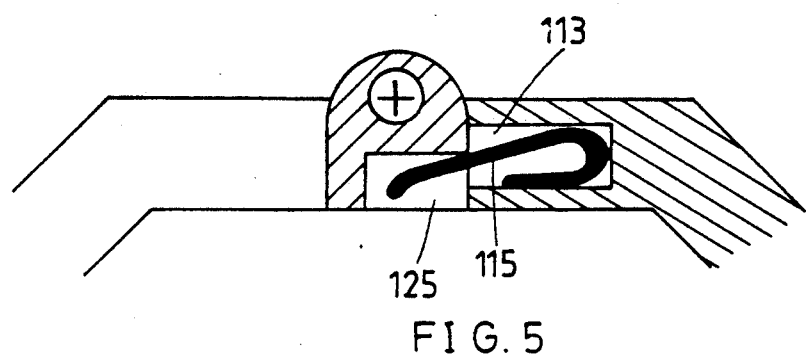
FIG. 5 depicts a second folding joint embodiment according to the present invention.
Figure 6:
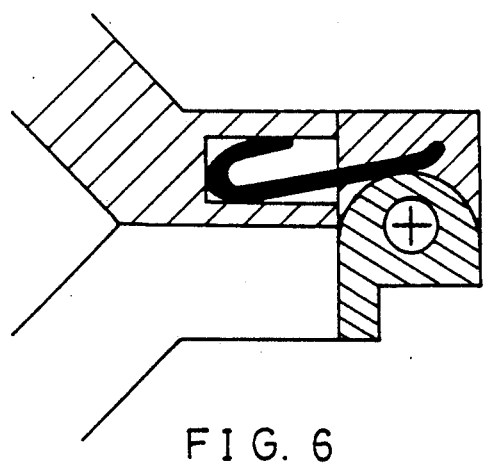
FIG. 6 illustrates the folding joint of FIG. 5 in a folded condition.

In this invention the groove 122 in the flank 124 of the arched end 123 can be functionally replaced by a notch 125 as shown in second embodiment of FIGS. 5 and 6. Otherwise, this second embodiment is assembled and operates the same as discussed above with reference to FIGS. 2-4.

As the above description is intended to only convey the preferred structure and function of the present invention, the invention is only intended to be limited by the scope of the following claims.

I claim:

1. A pair of folding spectacles comprising:

a pair of spectacle frames each having inner and outer portions, the inner portion of one of said spectacle frames being bifurcated, said bifurcated inner portion being formed with a blind hole, the inner portion of the other one of said spectacle frames terminating in an arched-shaped end, said arched-shaped end including means defining a recess;

a pair of temples each of which is pivotally attached to the outer portion of a respective one of said spectacle frames such that said temples are pivotable between an unfolded position in which said temples extend substantially perpendicular to a plane defined by said spectacle frames and a folded position in which said temples extend substantially parallel to said plane;

means for pivotally interconnecting the inner portions of said spectacle frames such that said spectacle frames can pivot within said plane defined by said spectacle frames between a folded position and an unfolded position; and a spring pin having a first end which extends into said blind hole and a second end which slides along said arched-shaped end as said spectacle frames are pivoted between their folded and unfolded positions and also extends into said recess defining means when said spectacle frames are fully unfolded.

2. The pair of folding spectacles of claim 1, wherein said recess defining means comprises a groove formed in said arched-shaped end.

3. The pair of folding spectacles of claim 1, wherein said recess defining means comprises a notch formed in said arch-shaped end.

4. The pair of folding spectacles of claim 1, wherein said means for pivotally interconnecting the inner portions of said spectacle frames comprises a screw extending through and interconnecting said bifurcated inner portion and said arched-shaped end of said spectacle frames, said screw extending substantially perpendicular to said plane.

* * * * *